(12) United States Patent
Murakami et al.

(10) Patent No.: US 12,073,726 B2
(45) Date of Patent: Aug. 27, 2024

(54) OPERATION MANAGEMENT UNIT AND OPERATION MANAGEMENT METHOD

(71) Applicant: TOYOTA JIDOSHA KABUSHIKI KAISHA, Toyota (JP)

(72) Inventors: Ryo Murakami, Susono (JP); Yuji Tachibana, Nisshin (JP); Minoru Nakadori, Toyota (JP); Daiki Kaneichi, Shinagawa-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 498 days.

(21) Appl. No.: 17/558,002

(22) Filed: Dec. 21, 2021

(65) Prior Publication Data
US 2022/0262256 A1    Aug. 18, 2022

(30) Foreign Application Priority Data
Feb. 16, 2021    (JP) ................. 2021-022888

(51) Int. Cl.
*G08G 1/00*    (2006.01)
*G08G 1/01*    (2006.01)

(52) U.S. Cl.
CPC .......... *G08G 1/202* (2013.01); *G08G 1/0125* (2013.01); *G08G 1/0141* (2013.01); *G08G 1/207* (2013.01)

(58) Field of Classification Search
CPC .... G08G 1/202; G08G 1/0125; G08G 1/0141; G08G 1/207
See application file for complete search history.

(56) References Cited

FOREIGN PATENT DOCUMENTS

| | | |
|---|---|---|
| JP | 2000-076595 A | 3/2000 |
| JP | 2003-318805 A | 11/2003 |
| JP | 2004-070766 A | 3/2004 |
| JP | 2011-227550 A | 11/2011 |
| JP | 2012-234379 A | 11/2012 |
| JP | 2018-049139 A | 3/2018 |
| JP | 2019-185816 A | 10/2019 |
| JP | 2020-100380 A | 7/2020 |
| KR | 10-0918275 B1 | 9/2009 |
| KR | 10-2048357 B1 | 1/2020 |
| KR | 10-2215885 B1 | 2/2021 |

OTHER PUBLICATIONS

Tae-Ho Kim et al., "Study on the Application of Bus Deadheading to Improve the Operation of Buses in the Metropolitan Area," Transportation Technology and Policy of the Korean Society of Transportation Engineers vol. 6, No. 4, Dec. 2009, pp. 27-40.

*Primary Examiner* — Mathew Franklin Gordon
(74) *Attorney, Agent, or Firm* — Finnegan, Henderson, Farabow, Garrett, and Dunner, LLP

(57) ABSTRACT

An operation management unit includes a controller that presents, to a user, a guidance that varies depending on whether a given vehicle stops at at least one stop at which a user is waiting, among a plurality of stops, with respect to each of a plurality of vehicles that travels along a route including one or more roads and the stops, and stops at one or more stops determined for each of the vehicles, among the stops.

20 Claims, 6 Drawing Sheets

OPERATION MANAGEMENT UNIT AND OPERATION MANAGEMENT METHOD

CROSS-REFERENCE TO RELATED APPLICATION

This application claims priority to Japanese Patent Application No. 2021-022888 filed on Feb. 16, 2021, incorporated herein by reference in its entirety.

BACKGROUND

1. Technical Field

The disclosure relates to an operation management unit and an operation management method.

2. Description of Related Art

A technology for selecting a bus stop close to a destination, from two or more routes, is described in Japanese Unexamined Patent Application Publication No. 2018-049139 (JP 2018-049139 A).

SUMMARY

The technology described in JP 2018-049139 A is not intended to clearly present, to a user waiting at a bus stop, a vehicle which the user should get on.

This disclosure provides a technology that clearly presents, to a user waiting at a stop, a vehicle which the user should get on.

An operation management unit according to the disclosure includes a controller configured to present, to a user, a guidance that varies depending on whether a given vehicle stops at at least one stop at which the user is waiting, among a plurality of stops, with respect to each of a plurality of vehicles that travels along a route including one or more roads and the stops, and stops at one or more stops determined for each of the vehicles, among the stops.

An operation management method according to the disclosure includes presenting, to a user, a guidance that varies depending on whether a given vehicle stops at at least one stop at which the user is waiting, among a plurality of stops, with respect to each of a plurality of vehicles that travels along a route including one or more roads and the stops, and stops at one or more stops determined for each of the vehicles, among the stops, by an operation management unit.

According to the disclosure, it is possible to clearly present the vehicle which the user should get on, to the user waiting at the stop.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
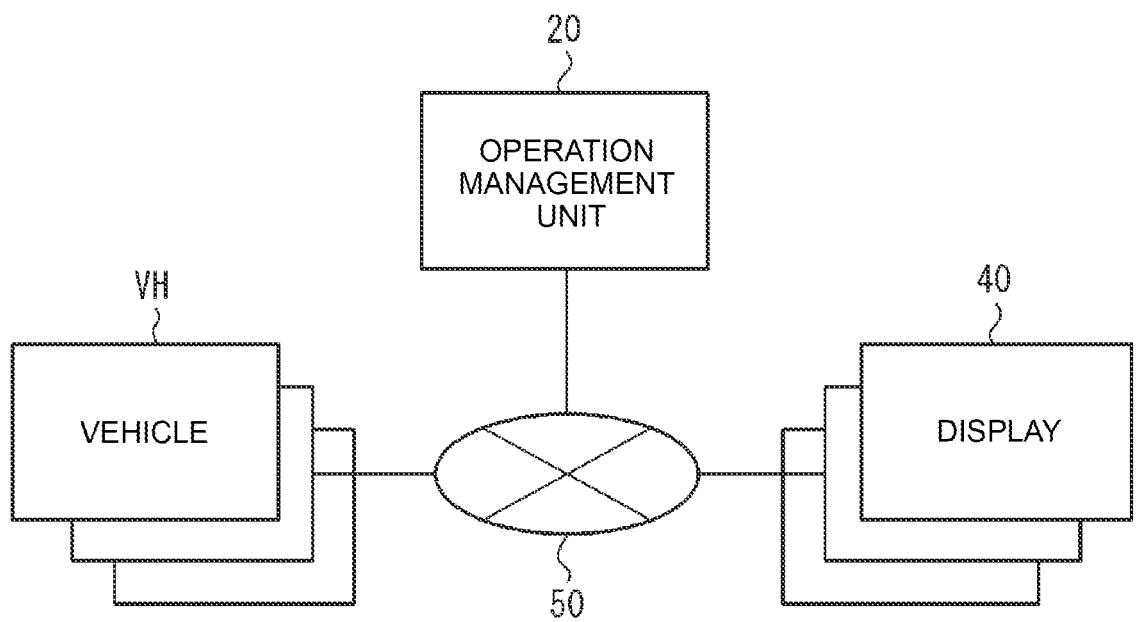
FIG. 1 is a view showing the configuration of an operation management system according to one embodiment of the disclosure.

One embodiment of the disclosure will be described with reference to the drawings.

In the drawings, the same reference signs are assigned to the same or corresponding portions. In the following description of the embodiment, description of the same or corresponding portions will be omitted or simplified when appropriate.

Referring to FIG. 1, an operation management system 10 according to this embodiment will be described.

As shown in FIG. 1, the operation management system 10 includes an operation management unit 20, a plurality of vehicles VH, and a plurality of displays 40.

The operation management unit 20 can communicate with the vehicles VH and the displays 40, via a network 50.

The network 50 includes the Internet, at least one WAN, at least one MAN, or a combination thereof. The "WAN" is an abbreviation for wide area network. The "MAN" is an abbreviation for metropolitan area network. The network 50 may include at least one wireless network, at least one optical network, or a combination thereof. The wireless network is, for example, an ad-hoc network, cellular network, wireless LAN, satellite communication network, or terrestrial microwave network. The "LAN" is an abbreviation for local area network.

The operation management unit 20 is installed in a facility, such as a data center. The operation management unit 20 is a server that belongs to a cloud computing system or any other computing system, for example.

While each vehicle VH is a bus in this embodiment, it is not limited to the bus, but may be any type of vehicle. Each vehicle VH is any type of vehicle, such as a gasoline vehicle, diesel vehicle, HV, PHV, EV, or FCV, for example. The "HV" is an abbreviation for hybrid vehicle. The "PHV" is an abbreviation for plug-in hybrid vehicle. The "EV" is an abbreviation for electric vehicle. The "FCV" is an abbreviation for fuel cell vehicle. Each vehicle VH may be driven by a driver, or may be automatically driven at any given level. The level of automated driving is one of Level 1 to Level 5 as the SAE levels of driving automation. The "SAE" is an abbreviation for the Society of Automotive Engineers. Each vehicle VH may be a vehicle specialized for MaaS. The "MaaS" is an abbreviation for Mobility as a Service.

Each display 40 is installed at a corresponding bus stop. Specifically, each display 40 is a signage. Each display 40 may be installed on a corresponding vehicle VH. Each display 40 may be an LED display installed on a road, for example. The "LED" is an abbreviation for light emitting diode. Each display 40 may be configured to display letters, video, or a combination thereof, in the form of projection mapping, for example. Each display 40 may function as a user interface.

The summary of this embodiment will be described with reference to FIG. 2, FIG. 3, and FIG. 4.

In this embodiment, the vehicles VH travel along a route 11 including one or more roads and a plurality of bus stops BS as the "stops" of the disclosure. The vehicles VH stop at one or more bus stops, among the bus stops BS, which is/are determined for each vehicle. The operation management unit 20 presents guidance 13 to a user 12, with respect to each of the vehicles VH, such that the guidance 13 varies depending on whether the vehicle concerned stops at at least one bus stop where the user 12 is waiting, among the bus stops BS.

In this embodiment, the vehicles VH include a vehicle VH1 through a vehicle VHn. In this embodiment, n is a natural number. The number of the vehicles VH may be arbitrarily determined. The bus stops BS include eight bus stops from bus stop BS1 to bus stop BS8. The number of the bus stops BS is not limited to eight, but may be arbitrarily determined. In the examples of FIG. 2 and FIG. 3, the vehicles VH run successively from the vehicle VH1, on the route 11, in directions of arrows from upper right on the paper.

Figure 2:
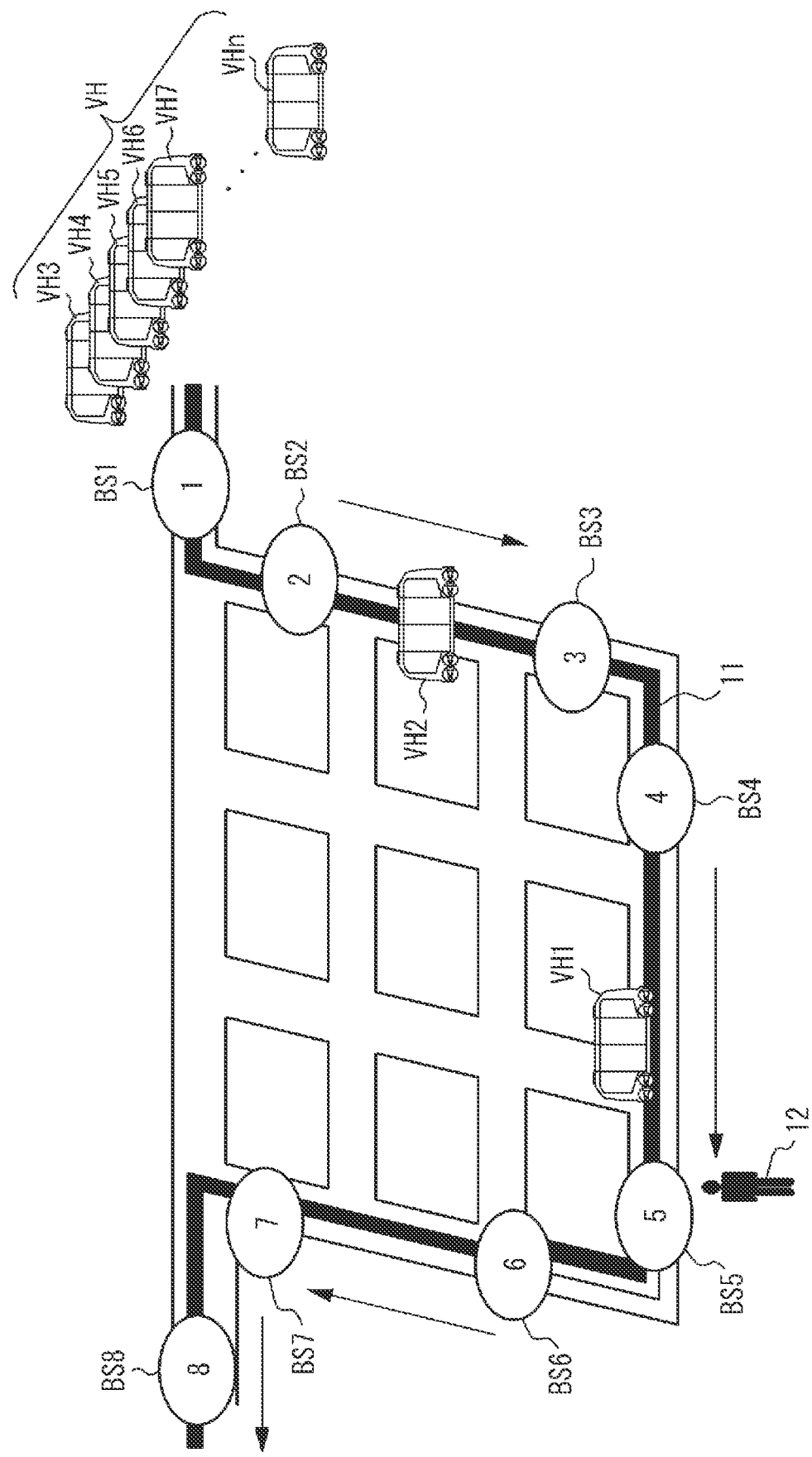
FIG. 2 is a view showing an example of vehicles and a route according to the embodiment of the disclosure.

In the example of FIG. 2, the vehicle VH1 and vehicle VH2, among the vehicles VH, nm along the route 11, at time Ta. The vehicle VH1 is approaching the fifth bus stop BS5, as one of the bus stops BS. The vehicle VH2 is approaching the third bus stop BS3, as one of the bus stops BS. The user 12 is waiting at the bus stop BS5.

Figure 3:
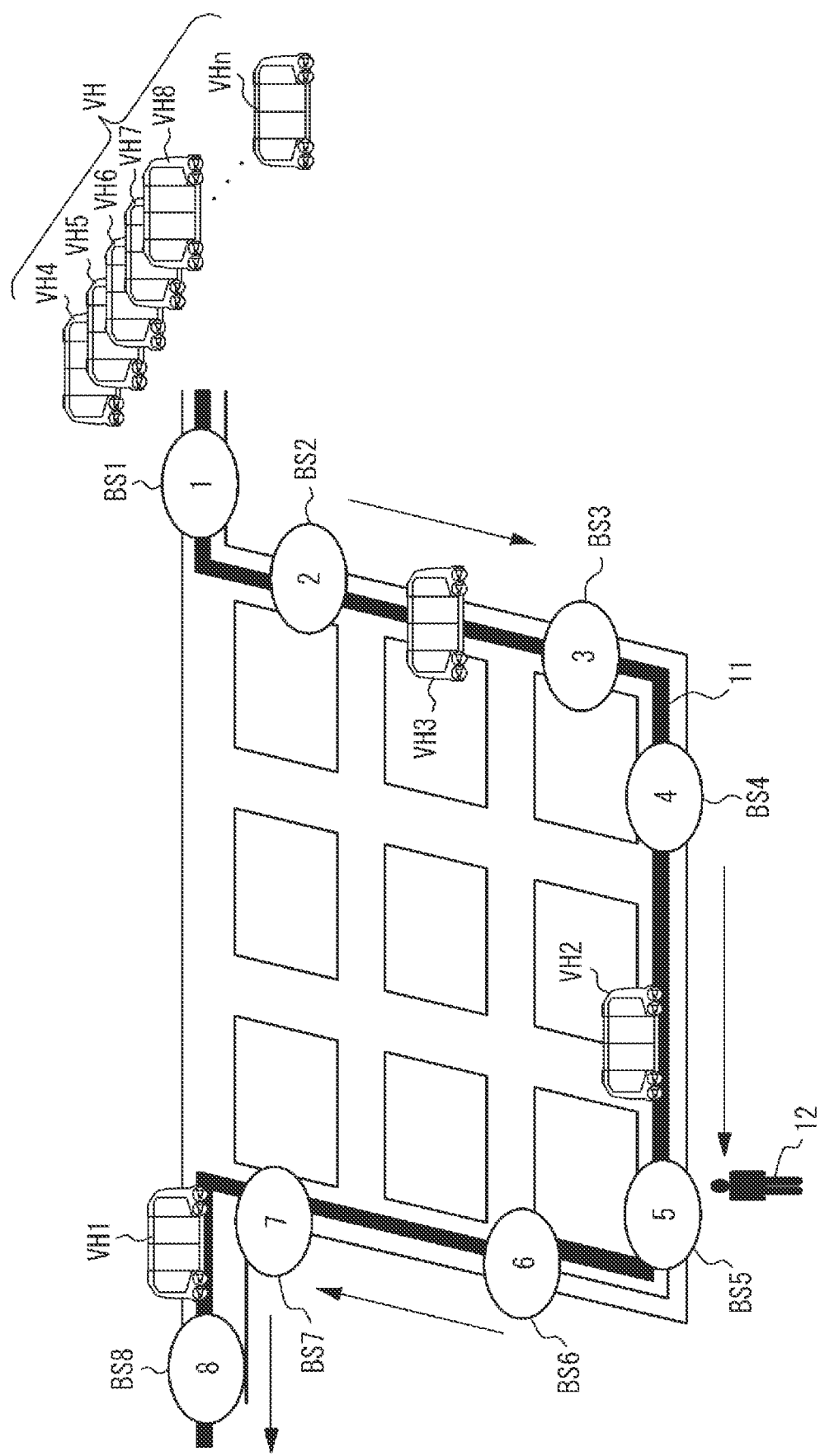
FIG. 3 is a view showing another example of vehicles and a route according to the embodiment of the disclosure.
Figure 4:
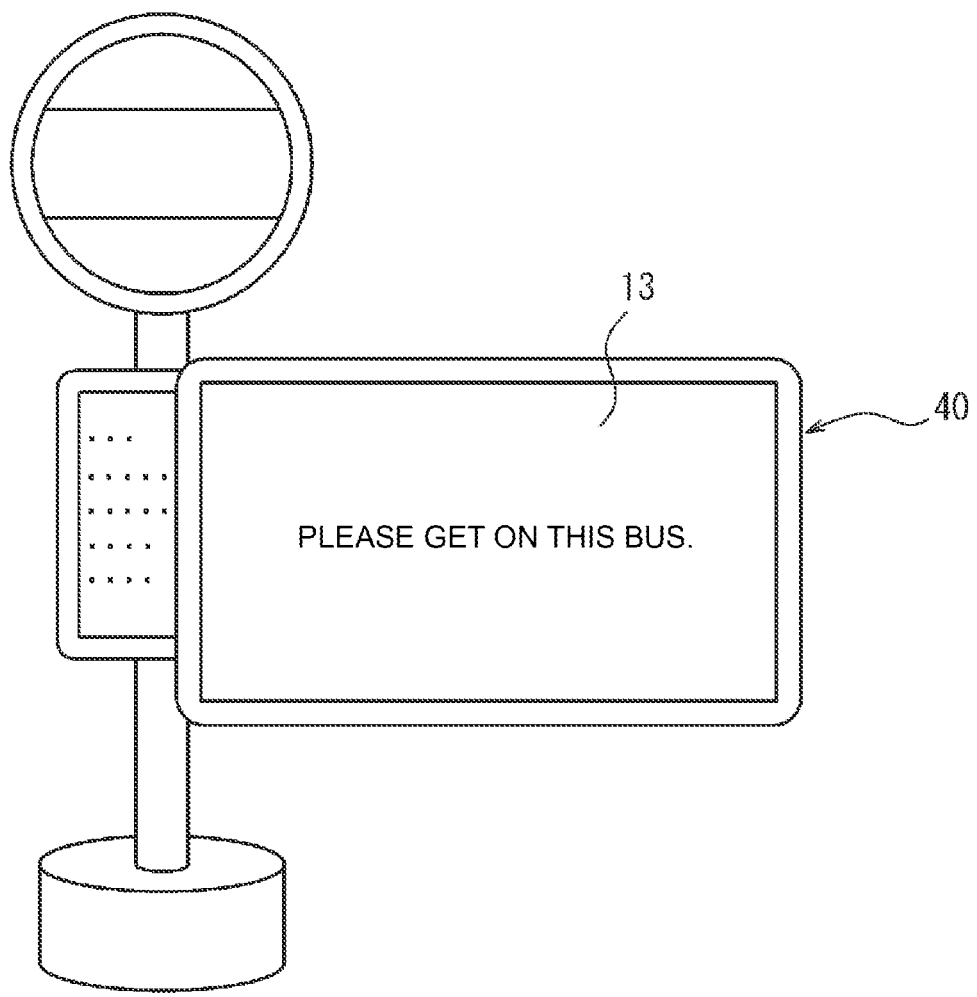
FIG. 4 is a view showing an example of a display installed at a bus stop according to the embodiment of the disclosure.

In the example of FIG. 3, the vehicle VH1, vehicle VH2, and vehicle VH3, among the vehicles VH, run at time Tb that is later than time Ta. The vehicle VH1 is approaching the eighth bus stop BS8, as one of the bus stops BS. The vehicle VH2 is approaching the fifth bus stop BS5, as one of the bus stops BS. The vehicle VH3 is approaching the third bus stop BS3, as one of the bus stops BS. The user 12 is waiting at the bus stop BS5.

For each of the vehicles VH including the vehicle VH1, vehicle VH2, and vehicle VH3, which one or ones of the bus stops BS at which the vehicle stops is/are determined. While the bus stops at which the vehicle stops may be determined by any method, they are determined for each vehicle, according to the order of operation assigned to the vehicle, in this embodiment. More specifically, the bus stops at which each vehicle stops are determined, depending on whether the order of operation is an odd number or an even number. For example, in the examples shown in FIG. 2 and FIG. 3, the vehicles VH1, VH3, VH5, VH7, . . . to which the orders of odd numbers are assigned are set to stop at odd-number bus stops, namely, the bus stops BS1, BS3, BS5, BS7, among the bus stops BS. The vehicles VH2, VH4, VH6, VH8, . . . to which the orders of even numbers are assigned are set to stop at even-number bus stops, namely, the bus stops BS2, BS4, BS6, BS8, among the bus stops BS. Namely, in this embodiment, the vehicles to which the orders of even numbers are assigned are set to stop at bus stops other than the bus stops at which the vehicles to which the orders of odd numbers are assigned stop, among the bus stops BS.

In the example of FIG. 2, the fifth bus stop BS5 at which the user 12 is waiting, among the bus stops BS, is focused on. As described above, the order assigned to the vehicle VH1 is an odd number, and the vehicle VH1 is set to stop at the bus stops BS1, BS3, BS5, BS7. As described above, the order assigned to the vehicle VH2 is an even number, and the vehicle VH2 is set to stop at the bus stops other than the bus stops BS1, BS3, BS5, BS7 at which the vehicle VH1 stops. Namely, the vehicle VH2 is set not to stop at the bus stop BS5. In the example of FIG. 2, when the vehicle VH1 approaches the bus stop BS5, the operation management unit 20 determines whether the vehicle VH1 stops at the bus stop BS5. Also, in the example of FIG. 3, when the vehicle VH2 approaches the bus stop BS5, the operation management unit 20 determines whether the vehicle VH2 stops at the bus stop BS5.

In this embodiment, the operation management unit 20 determines, with respect to each of the vehicles VH, whether the vehicle stops at at least one bus stop. In this embodiment, the operation management unit 20 determines whether the vehicle stops at at least one bus stop, based on the order assigned to each vehicle. In the example of FIG. 2, the operation management unit 20 determines whether the vehicle VH1 stops at the bus stop BS5, based on the order assigned to the vehicle VH1. The operation management unit 20 determines that the vehicle VH1 stops at the bus stop BS5, and presents, to the user 12 waiting at the bus stop BS5, a guidance message that encourages the user 12 to get on the vehicle VH1, as the guidance 13. More specifically, as shown in the example of FIG. 4, a message that says "Please get on this bus," as the guidance 13, is displayed on the display 40 provided at the bus stop BS5. Similarly, in the example of FIG. 3, when the vehicle VH2 approaches the bus stop BS5, the operation management unit 20 determines whether the vehicle VH2 stops at the bus stop BS5. The operation management unit 20 determines that the vehicle VH2 does not stop at the bus stop BS5, and presents, to the user 12 waiting at the bus stop BS5, guidance information that informs the user 12 of the arrival time of the vehicle VH3 that follows the VH2 and stops at the bus stop BS5, as the guidance 13. Specifically, the arrival time of the vehicle VH3 is displayed as the guidance 13, on the display 40 installed at the bus stop BS5.

The operation management unit 20 performs substantially the same processing as that performed on the vehicle VH1 and vehicle VH2, with respect to each of the vehicles VH, and determines whether each vehicle stops at at least one bus stop among the bus stops BS. Also, the operation management unit 20 performs substantially the same processing as that performed on the bus stop BS5, with respect to each of the bus stops BS on the route 11, and determines whether the vehicle stops at each bus stop.

In this embodiment, even where the bus stops at which the vehicles VH stop differ from vehicle to vehicle, it is determined, with respect to each of the vehicles VH, whether the vehicle stops at the bus stops. Then, the guidance message that encourages the user to get on the vehicle when the vehicle stops, or the guidance information that informs the user of the arrival time of the vehicle that follows the vehicle concerned and stops at the bus stop when the vehicle does not stop, is presented as the guidance 13 to the user 12 waiting at the bus stop BS. Thus, according to this embodiment, it is possible to make the vehicle that should be taken by the user 12 apparent to the user 12, namely, to clearly present the vehicle that should be taken by the user 12 to the user 12.

Figure 5:
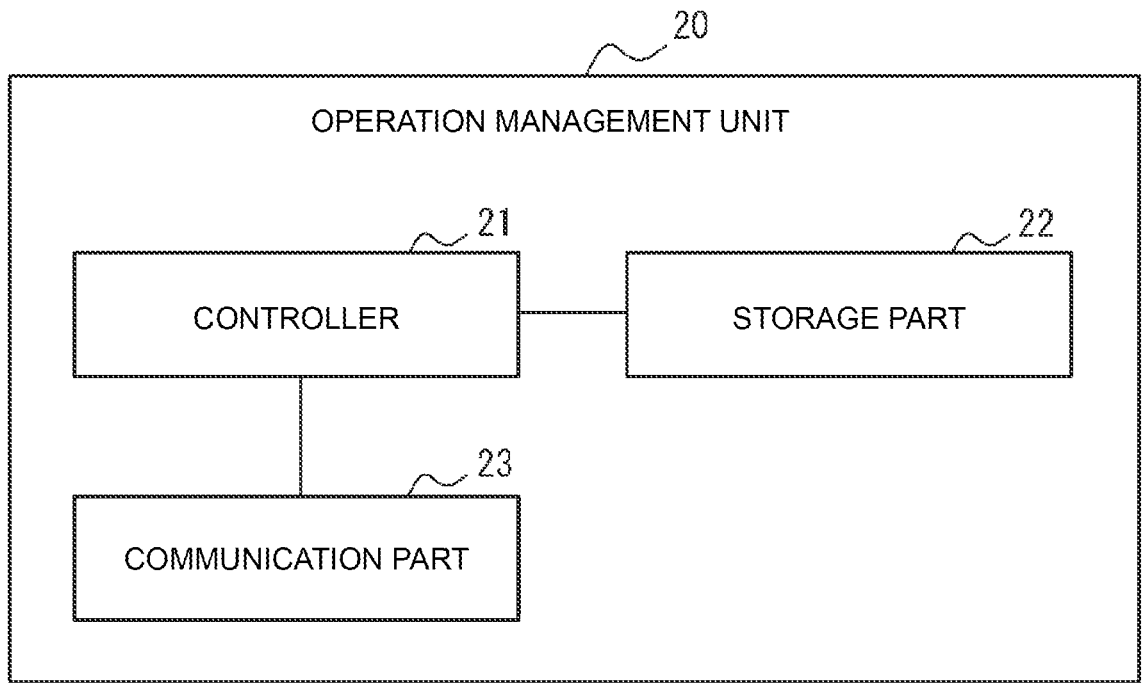
FIG. 5 is a block diagram showing the configuration of an operation management unit according to the embodiment of the disclosure.

Referring to FIG. 5, the configuration of the operation management unit 20 according to this embodiment will be described.

The operation management unit 20 includes a controller 21, storage part 22, and communication part 23.

The controller 21 includes at least one processor, at least one programmable circuit, at least one dedicated circuit, or a combination thereof. The processor is a general-purpose processor, such as a CPU or a GPU, or a dedicated processor specialized for particular processing. The "CPU" is an abbreviation for central processing unit, and the "GPU" is an abbreviation for graphics processing unit. The programmable circuit is, for example, an FGPA, which is an abbreviation for field-programmable gate array. The dedicated circuit is, for example, an ASIC, which is an abbreviation for application specific integrated circuit. The controller 21 performs processing concerning operation of the operation management unit 20, while controlling respective parts of the operation management unit 20.

The storage part 22 includes at least one semiconductor memory, at least one magnetic memory, at least one optical memory, or a combination of at least two types of these memories. The semiconductor memory is, for example, a RAM or a ROM. The "RAM" is an abbreviation for random access memory. The "ROM" is an abbreviation for read-only memory. The RAM is, for example, a SRAM or a DRAM. The "SRAM" is an abbreviation for static random access memory. The DRAM is an abbreviation for dynamic random access memory. The ROM is, for example, an EEPROM, which is an abbreviation for electrically erasable programmable read-only memory. The storage part 22 functions as a main storage, an auxiliary storage, or a cache memory. In the storage part 22, data used for operation of the operation management unit 20, and data obtained through operation of the operation management unit 20, are stored.

The communication part 23 includes at least one communication interface. The communication interface is, for example, a LAN interface. The communication part 23 receives data used for operation of the operation management unit 20, and sends data obtained through operation of the operation management unit 20. In this embodiment, the communication part 23 conducts communications with the vehicles VH and the displays 40.

The processor as the controller 21 executes an operation management program according to this embodiment, so as to implement the functions of the operation management unit 20. Namely, the functions of the operation management unit 20 are implemented by software. The operation management program causes a computer to carry out operation of the operation management unit 20, so that the computer functions as the operation management unit 20. Namely, the computer carries out operation of the operation management unit 20 according to the operation management program, to thus function as the operation management unit 20.

The program can be stored in a non-temporary computer-readable medium. The non-temporary computer-readable medium is, for example, a flash memory, magnetic recording device, optical disc, magnetooptical recording medium, or ROM. The program is distributed by selling, delivering, or leasing a portable medium, such as an SD card, DVD, or CD-ROM in which the program is stored, for example. The "SD" is an abbreviation for "Secure Digital". The "DVD" is an abbreviation for digital versatile disc. The "CD-ROM" is an abbreviation for compact disc read-only memory. The program may be distributed, by storing the program in a storage of a server, and transferring the program from the server to other computers. The program may be provided as a program product.

The computer once stores the program stored in the portable medium or the program transferred from the server, in the main storage. Then, the computer causes the processor to read the program stored in the main storage, and performs processing according to the program read. The computer may read the program directly from the portable medium, and preform processing according to the program. Each time the program is transferred from the server to the computer, the computer may perform processing according to the program received. The computer may perform processing via a so-called ASP service, namely, by implementing functions only by issuing execution commands and obtaining results, without transferring the program from the server to the computer. The "ASP" is an abbreviation for application service provider. The program includes information that is subjected to processing by a computer and is equivalent to the program. For example, data that are not direct commands to the computer, but have properties that specify processing of the computer, correspond to "the information equivalent to the program".

A part or all of the functions of the operation management unit 20 may be implemented by a programmable circuit or dedicated circuit as the controller 21. Namely, a part or all of the functions of the operation management unit 20 may be implemented by hardware.

Figure 6:
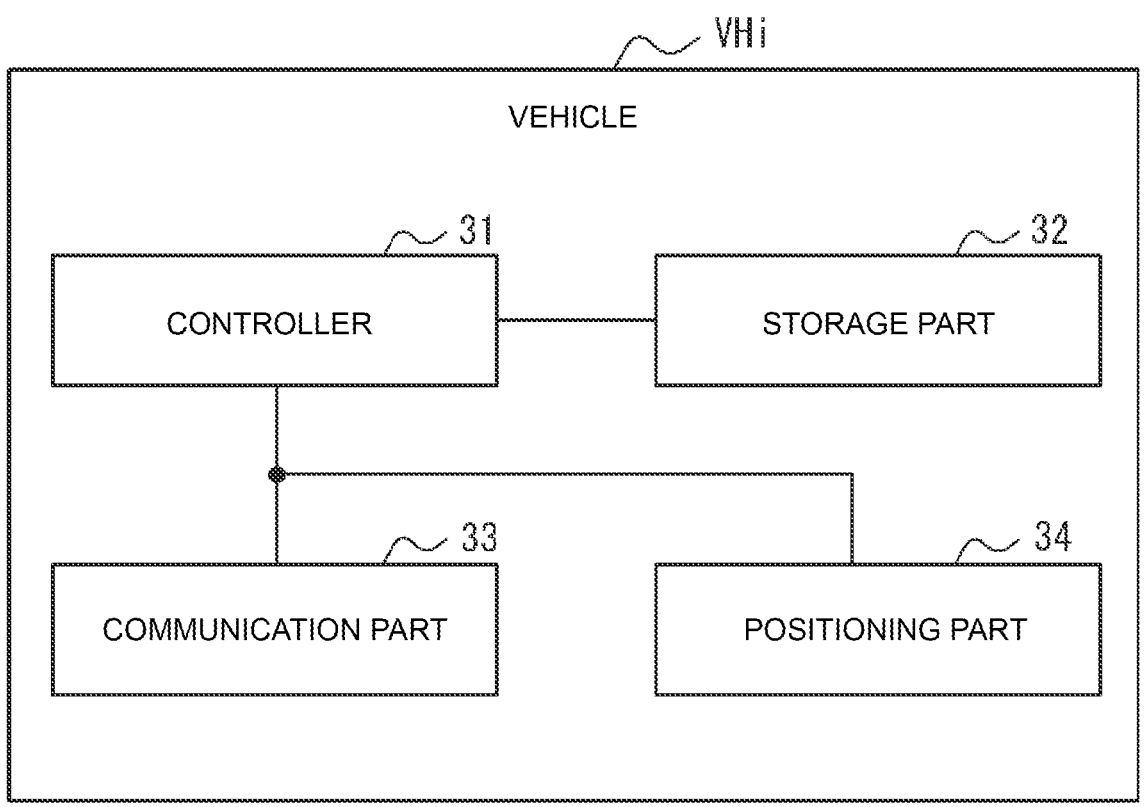
FIG. 6 is a block diagram showing the configuration of a vehicle according to the embodiment of the disclosure.

Referring to FIG. 6, the configuration of a vehicle VHi according to this embodiment will be described. In the examples of FIG. 2 and FIG. 3, i=1, 2, . . . , n.

The vehicle VHi includes a controller 31, storage part 32, communication part 33, and positioning part 34.

The controller 31 includes at least one processor, at least one programmable circuit, at least one dedicated circuit, at least one ECU, or a combination thereof. The "ECU" is an abbreviation for electronic control unit. The processor is a general-purpose processor, such as a CPU or a GPU, or a dedicated processor specified for particular processing. The programmable circuit is, for example, a FPGA. The dedicated circuit is, for example, an ASIC. The controller 31 performs processing concerning operation of the vehicle VHi, while controlling respective functional components of the vehicle VHi.

The storage part 32 includes at least one semiconductor memory, at least one magnetic memory, at least one optical memory, or a combination of two or more types of memories. The semiconductor memory is, for example, a RAM or a ROM. The RAM is, for example, an SRAM or a DRAM. The ROM is, for example, an EEPROM. The storage part 32 functions as a main storage, auxiliary storage, or cache memory, for example. The storage part 32 stores data used for operation of the vehicle VHi, and data obtained through operation of the vehicle VHi.

The communication part 33 includes at least one communication interface. The communication interface is, for example, an interface corresponding to a mobile communication standard, such as LTE, 4G standard, or 5G standard, an interface corresponding to a near field communication standard, such as Bluetooth (registered trademark), or a LAN interface. The "LTE" is an abbreviation for Long-Term Evolution. The "4G" is an abbreviation for 4th generation. The "5G" is an abbreviation for 5th generation. The communication part 33 receives data used for operation of the vehicle VHi, and sends data obtained through operation of the vehicle VHi.

The positioning part 34 includes at least one GNSS receiver. The "GNSS" is an abbreviation for global navigation satellite system. The GNSS is, for example, GPS, QZSS, BeiDou, GLONASS, or Galileo. The "GPS" is an abbreviation for Global Positioning System. The "QZSS" is an abbreviation for Quasi-Zenith Satellite System. A satellite of the QZSS is called quasi-zenith satellite. The "GLONASS" is an abbreviation for Global Navigation Satellite System. The positioning part 34 measures the position of the vehicle VHi.

Figure 7:
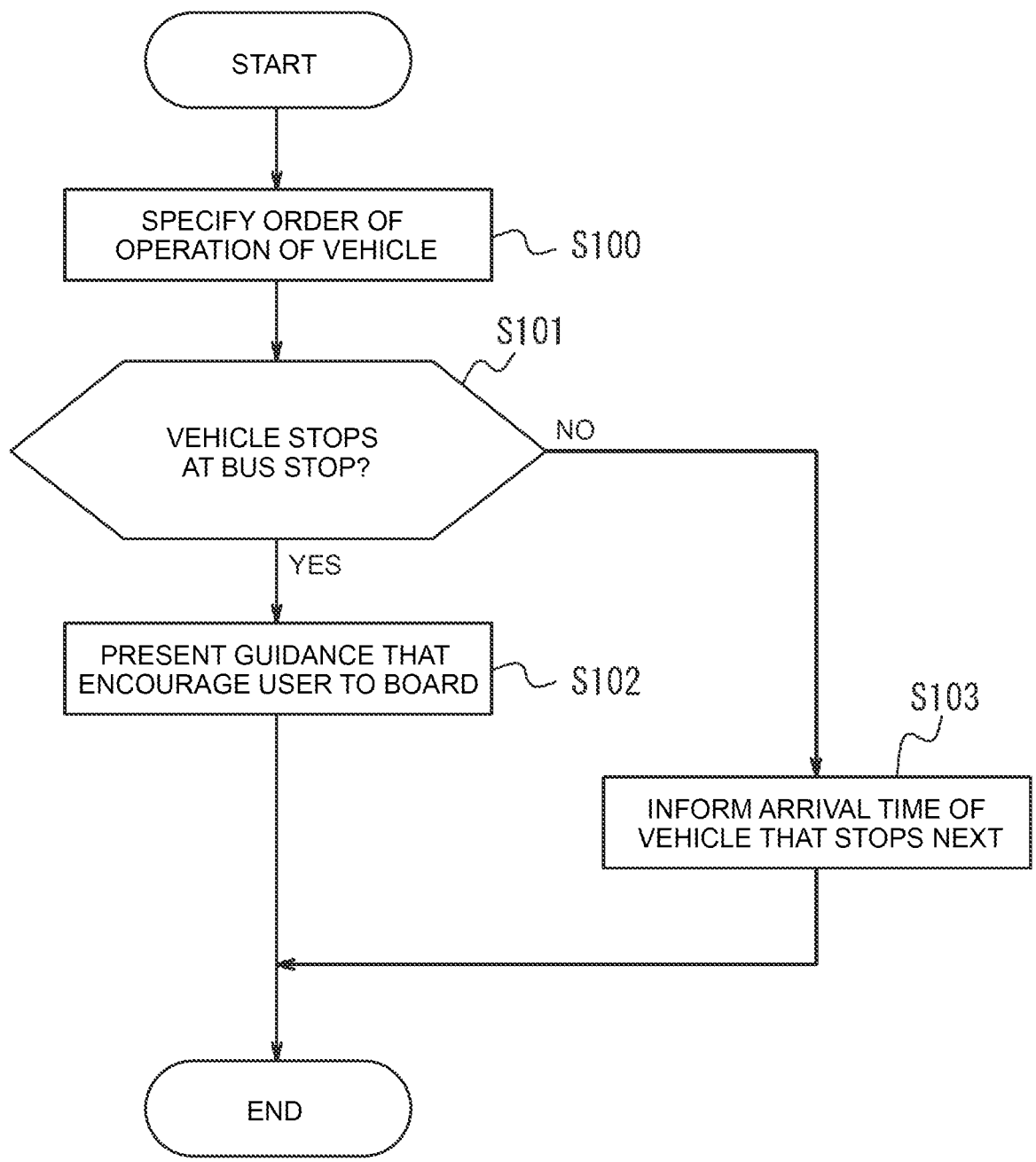
FIG. 7 is a flowchart illustrating operation of the operation management system according to the embodiment of the disclosure.

Referring to FIG. 7, operation of the operation management system 10 according to this embodiment will be described. The operation corresponds to an operation management method according to the embodiment.

In step S100, the controller 21 of the operation management unit 20 specifies the order of operation assigned to each vehicle, with respect to each of the vehicles VH. More specifically, the controller 21 specifies the orders assigned to the vehicle VH1, vehicle VH2, vehicle VH3, ... and vehicle VHn, respectively. While the orders may be specified by any method, they are specified by the following method, for example. The storage part 22 may store, in advance, a vehicle database indicating the order of operation for each vehicle number of the vehicle VH capable of communicating with the operation management unit 20 via the communication part 23. The controller 21 may obtain identification information indicating the vehicle number from each vehicle present on the route 11 via the communication part 23, and search the vehicle database, using a query including the identification information, so as to specify the order of operation of each vehicle. In another method, the controller 21 may directly receive information indicating the order of operation, from each vehicle present on the route 11, via the communication part 23. As described above, in this embodiment, the vehicles VH run in the order of the vehicle VH1, vehicle VH2, vehicle VH3, ..., vehicle VHn. The controller 21 specifies the orders assigned to the vehicle VH1, vehicle VH2, vehicle VH3, ..., vehicle VHn, as "1", "2", "3", ... "n".

In step S101, the controller 21 of the operation management unit 20 determines, with respect to each of the vehicles VH, whether the vehicle stops at at least one bus stop. More specifically, the controller 21 determines, with respect to each of the vehicle VH1, vehicle VH2, vehicle VH3, ..., and vehicle VHn, whether the vehicle stops at the bus stop BS5, as the above-mentioned at least one bus stop.

As described above, in this embodiment, the one or more bus stops at which the vehicle VH stops are determined for each vehicle, depending on whether the order assigned to the vehicle VH is an odd number or an even number. In this embodiment, the vehicles to which the orders of odd numbers are assigned are set to stop at odd-number bus stops, among the bus stops BS. Also, the vehicles to which the orders of even numbers are assigned are set to stop at even-number bus stops, among the bus stops BS.

The controller 21 of the operation management unit 20 determines whether the vehicle VH1 stops at the bus stop BS5 as the above-mentioned at least one bus stop, for example. The controller 21 determines that the vehicle VH1 stops as the odd-number bus stop BS5, since the order "1" specified for the vehicle VH1 in step S100 is an odd number. Then, step S102 is executed.

The controller 21 of the operation management unit 20 also determines, with respect to the vehicle VH2, whether it stops at the bus stop BS5 as the above at least one bus stop, like the vehicle VH1. The controller 21 determines that the vehicle VH2 does not stop at the odd-number bus stop BS5, since the order "2" specified for the vehicle VH2 in step S100 is an even number. Or, in this embodiment, the vehicles to which the even-number orders are assigned are set to stop at bus stops other than the bus stops at which the vehicles to which the odd-number orders are assigned stop, among the bus stops BS. Thus, the controller 21 may determine that the vehicle VH2 to which the even-number order "2" is assigned does not stop at the bus stop BS5 at which the vehicle VH1 to which the odd-number order "1" is assigned stops. Then, step S103 is executed.

In this embodiment, the operation of step S101 is not limitedly performed on the vehicle VH1 and the vehicle VH2, but may be similarly performed on other vehicles included in the vehicles VH.

In step S102, the controller 21 of the operation management unit 20 presents a guidance message that encourages the user 12 to board, as the guidance 13, to the user 12. More specifically, the controller 21 presents the guidance 13 via the display 40 provided at the bus stop BS5. For example, the controller 21 causes a signage as the display 40 provided at the bus stop BS5 to display a message that says, "Please get on this bus."

In step S103, the controller 21 of the operation management unit 20 presents guidance information that gives notice of the arrival time of a vehicle that stops next at at least one bus stop, as the guidance 13, to the user 12. More specifically, the controller 21 presents the guidance that gives notice of the arrival time of the vehicle VH3 that stops at the bus stop BS5 after the vehicle VH2 passes the bus stop BS5. While the arrival time of the vehicle VH3 at the bus stop BS5 may be obtained by any method, it is obtained by the following method, for example. Initially, the controller 21 receives position information indicating the position of the vehicle VH3, which was obtained by the positioning part 34 of the vehicle VH3, via the communication part 23. The controller 21 obtains the arrival time of the vehicle VH3, by calculating the required time of travel from the position of the vehicle VH3 indicated by the position information received, to the bus stop BS5. The controller 21 displays the arrival time of the vehicle VH3 thus obtained, on the signage as the display 40 provided at the bus stop BS5. Instead of presenting the guidance that gives notice of the arrival time of the vehicle VH3, the controller 21 may present guidance that merely informs that the vehicle VH2 passes the bus stop BS5, as the guidance 13. More specifically, the controller 21 may display a message "Passing", as the guidance 13, when the vehicle VH2 passes the bus stop BS5, on the display 40 installed at the bus stop BS5.

In this embodiment, the guidance 13 is presented by an informing method using equipment other than the user's device. Thus, the user 12 can get on the vehicle, without relying on a particular device.

As described above, with respect to each of the vehicles VH that travels along the route 11 including one or more roads and a plurality of bus stops BS, and stops at one or more bus stops determined for each vehicle, among the bus stops BS, the controller 21 of the operation management unit 20 presents the guidance 13 that varies depending on whether the vehicle stops at at least one bus stop BS5 at which the user 12 is waiting, among the bus stops BS, to the user 12.

According to this embodiment, it is possible to clearly present the vehicle the user 12 should get on, to the user 12 who is waiting at the bus stop.

This disclosure is not limited to the above embodiment. For example, two or more blocks described in the block diagrams may be integrated, or one block may be divided into two or more blocks. Two or more steps described in the flowchart may be executed in parallel, or in a different order, according to the processing capability of a device that executes each step, or as needed, instead of being executed in chronological order according to the description. In other aspects, the illustrated embodiment may be changed without departing from the principle of the disclosure.

As one modified example of this embodiment, the controller 21 of the operation management unit 20 determines, with respect to each of the vehicles VH, whether the vehicle stops at at least one bus stop, based on the operation schedule of the vehicles VH, instead of determining whether the vehicle stops at at least one bus stop, based on the order of operation. The operation schedule includes the departure time of each vehicle. While the operation schedule of each vehicle may be obtained by any method, it is obtained by the following method, for example. The storage part 22 may store, in advance, a vehicle database indicating the operation schedule of each vehicle, for each vehicle number of the vehicle VH capable of communicating with the operation management unit 20 via the communication part 23. The controller 21 may obtain identification information indicating the vehicle number, from each vehicle present on the route 11, via the communication part 23, and obtain the operation schedule of each vehicle, by searching the vehicle database using a query including the identification information. In another method, the controller 21 may directly receive information indicating the operation schedule of each vehicle, from each vehicle present on the route 11, via the communication part 23.

As one modified example of this embodiment, the controller 21 of the operation management unit 20 may determine whether a first vehicle, as one of the vehicles VH, stops at at least one bus stop, depending on whether a second vehicle that precedes the first vehicle stopped at the at least one bus stop. More specifically, the controller 21 may determine that the vehicle VH2 does not stop at the bus stop BS5, when the vehicle VH1 that precedes the vehicle VH2 stopped at the bus stop BS5. The controller 21 may determine that the vehicle VH3 stops at the bus stop BS5, when the vehicle VH2 that precedes the vehicle VH3 passed the bus stop BS5. In this modified example, the controller 21 need not specify the order assigned to the vehicle VH2 or obtain the operation schedule of the vehicle VH2, if it knows that the vehicle VH1 stopped at the bus stop BS5. Also, the controller 21 need not specify the order assigned to the vehicle VH3 or obtain the operation schedule of the vehicle VH3, if it knows that the vehicle VH2 passed the bus stop BS5.

As one modified example of the embodiment, the controller 21 of the operation management unit 20 may present the guidance 13 by displaying the guidance 13 on a road where the bus stop BS5 is installed, instead of presenting the guidance 13 via the display 40 provided at the bus stop BS5. For example, the controller 21 may display a message that says, "Please get on this bus," on a LED display provided as the display 40 on the road where the bus stop BS5 is installed. Or the controller 21 may present the guidance 13 via a terminal device held by the user 12. For example, the controller 21 may display a message that says, "Please get on this bus," on a smartphone as the terminal device held by the user 12. Or the controller 21 may present the guidance 13 via an output device provided in each vehicle. For example, the controller 21 may display a message that says, "Please get on this bus," on a display mounted as the output device on the vehicle body of the vehicle VH1. In these modified examples, the controller 21 can present the guidance to the user 12, even if the display 40, such as a signage, is not installed at the bus stop BS.

As one modified example of this embodiment, the controller 21 of the operation management unit 20 may further determine whether the user 12 is a visually impaired person. While the controller 21 may determine whether the user 12 is a visually impaired person by any method, it may be done through image recognition of an image of the user 12 captured by an imaging device, such as a vehicle-mounted camera installed on the vehicle VH, for example. Also, the determination may be made based on whether the user 12 has a walking support device, a reading camera, or a wearable device, such as glasses, intended for use by visually impaired people. Further, when the controller 21 determines that the user 12 is a visually impaired person, it may present the guidance 13 by generating the guidance 13 with voice via a directional speaker. The directional speaker can linearly throw sound only in one direction, so that the sound can send information only to a person as a target, without being mixed with noise.

According to this modified example, the guidance 13 is presented to the visually impaired person via the directional speaker, so that personal information, such as the name of the user 12, can be included in the guidance 13, and presented to the user 12. This makes it easier for the user 12 to become aware of the guidance 13. As a result, even if the user 12 is visually impaired, it is possible to clearly present the vehicle which the user 12 should get on, to the user 12.

In the above embodiment, when an autonomous driving car enters a sidewalk, the controller 21 of the operation management unit 20 may further inform the user 12 that the autonomous driving car is approaching, by lighting LEDs on the road. A shared car may be included as one type of the autonomous driving car. For example, the controller 21 may display a message that says, "A vehicle other than buses is approaching," on the display 40. In this case, the display 40 may be a signage provided at the bus stop BS5, or LEDs provided on the road where the bus stop BS5 is installed. The controller 21 may generate sound, such as warning sound, via an output device provided in the display 40, instead of displaying a message. According to this embodiment, even when a vehicle other than the vehicles VH approaches the bus stop, the infrastructure side, such as a bus stop or a road, can make the user 12 aware of the entry of the vehicle; therefore, the user 12 can quickly detect a danger, such as a collision, and avoid the danger.

In the above embodiment, when two or more vehicles heading for different destinations arrive simultaneously at at least one bus stop, the controller 21 of the operation management unit 20 may further present information that identifies the respective vehicles to the user 12. More specifically, suppose a vehicle VG having a different destination from the vehicles VH runs along a route that is partly shared by the route 11, and the vehicle VG arrives at any one of the bus stops BS, at the same time that at least one of the vehicles VH arrives at the same bus stop BS. In this case, the controller 21 may display a color corresponding to the destination or information indicating the name, etc. of the destination for each vehicle, as information identifying the vehicle, on the display 40. For example, while the vehicle VH is heading for a destination X, and the vehicle VG is heading for a destination Y, the vehicle VG, as well as the vehicle VH, is scheduled to run along the route 11, until it reaches at least the bus stop BS8, in the examples of FIG. 2 or FIG. 3. Where blue is the color corresponding to the destination X, and red is the color corresponding to the destination Y, the controller 21 displays the name of the destination X with blue letters for the vehicle VH, on the display 40, as information that identifies the destination for each vehicle. The controller 21 displays the name of the destination Y with red letters for the vehicle VG, on the display 40, as information that identifies the destination for each vehicle. In this case, the display 40 may be a signage provided at the bus stop BS5, or an output device mounted on the vehicle body of the vehicle VH or the vehicle VG. With this arrangement, the user 12 can identify or recognize the vehicle to be ridden, according to the destination. In another example, the controller 21 may light LEDs corresponding to the position at which the vehicle VH stops in blue, and light LEDs corresponding to the position at which the vehicle VG stops in red, among the LEDs provided as the display 40 on the road where the bus stop BS5 is installed, so that information that identifies the destination for each vehicle is presented to the user 12. In this manner, the user 12 can stand by in advance, at around the stop position of the vehicle to be ridden according to the destination. According to this embodiment, it is possible to further clearly present the vehicle which the user 12 should get on, to the user 12.

What is claimed is:

1. An operation management unit comprising a controller configured to present, to a user, a guidance that varies depending on whether a given vehicle stops at at least one stop at which the user is waiting, among a plurality of stops, with respect to each of a plurality of vehicles that travels along a route including one or more roads and the stops, and stops at one or more stops determined for each of the vehicles, among the stops.

2. The operation management unit according to claim 1, wherein:
   the one or more stops are determined for each of the vehicles, according to an order of operation assigned to each of the vehicles; and
   the controller is configured to determine, with respect to each of the vehicles, whether the given vehicle stops at the at least one stop, based on the order assigned to the given vehicle.

3. The operation management unit according to claim 2, wherein the one or more stops are determined for each of the vehicles, depending on whether the order is an odd number or an even number.

4. The operation management unit according to claim 3, wherein a first set of vehicles to each of which an even-number order is assigned as the order, among the vehicles, stop at some stops, among the stops, other than stops at which a second set of vehicles to each of which an odd-number order is assigned as the order, among the vehicles, stop.

5. The operation management unit according to claim 1, wherein:
   the vehicles include a first vehicle, and a second vehicle that precedes the first vehicle; and
   the controller is configured to determine whether the first vehicle stops at the at least one stop, depending on whether the second vehicle stopped at the at least one stop.

6. The operation management unit according to claim 5, wherein:
   the controller is configured to determine that the first vehicle does not stop at the at least one stop, when the second vehicle stopped at the at least one stop; and
   the controller is configured to determine that the first vehicle stops at the at least one stop, when the second vehicle passed the at least one stop.

7. The operation management unit according to claim 1, wherein the controller is configured to determine, with respect to each of the vehicles, whether the given vehicle stops at the at least one stop, based on an operation schedule of the vehicles.

8. The operation management unit according to claim 1, wherein the controller is configured to present a guidance message that encourages the user to get on the given vehicle, as the guidance, when the controller determines that the given vehicle stops at the at least one stop.

9. The operation management unit according to claim 1, wherein the controller is configured to present guidance information that informs an arrival time of one of the vehicles that stops at the at least one stop next, as the guidance, when the controller determines that the given vehicle does not stop at the at least one stop.

10. The operation management unit according to claim 1, wherein the controller is configured to present the guidance via a display provided at the at least one stop.

11. The operation management unit according to claim 1, wherein the controller is configured to present the guidance by displaying the guidance on a road where the at least one stop is installed.

12. The operation management unit according to claim 1, wherein the controller is configured to present the guidance via a terminal device held by the user.

13. The operation management unit according to claim 1, wherein the controller is configured to present the guidance via an output device provided in each of the vehicles.

14. The operation management unit according to claim 1, wherein:
   the controller is configured to determine whether the user is a visually impaired person; and
   the controller is configured to present the guidance by generating the guidance with voice, via a directional speaker, when the controller determines that the user is the visually impaired person.

15. The operation management unit according to claim 1, wherein, when two or more of the vehicles heading for different destinations simultaneously arrive at the at least one stop, the controller is configured to further present information that identifies each of the two or more of the vehicles, to the user.

16. An operation management method comprising presenting, to a user, a guidance that varies depending on whether a given vehicle stops at at least one stop at which the user is waiting, among a plurality of stops, with respect to each of a plurality of vehicles that travels along a route including one or more roads and the stops, and stops at one or more stops determined for each of the vehicles, among the stops, by an operation management unit.

17. The operation management method according to claim 16, wherein:
   the one or more stops are determined for each of the vehicles, according to an order of operation assigned to each of the vehicles; and
   the operation management unit determines, with respect to each of the vehicles, whether the given vehicle stops at the at least one stop, based on the order assigned to the given vehicle.

18. The operation management method according to claim 17, wherein the one or more stops are determined for each of the vehicles, depending on whether the order is an odd number or an even number.

19. The operation management method according to claim 18, wherein a first set of vehicles to each of which an even-number order is assigned as the order, among the vehicles, stop at some stops, among the stops, other than stops at which a second set of vehicles to each of which an odd-number order is assigned as the order, among the vehicles, stop.

20. The operation management method according to claim 16, wherein the operation management unit determines, with respect to each of the vehicles, whether the given vehicle stops at the at least one stop, based on an operation schedule of the vehicles.

\* \* \* \* \*